(No Model.)
H. F. MILES.
MANUFACTURE OF DECORATIVE GLASS PRODUCTS.
No. 287,768.        Patented Oct. 30, 1883.
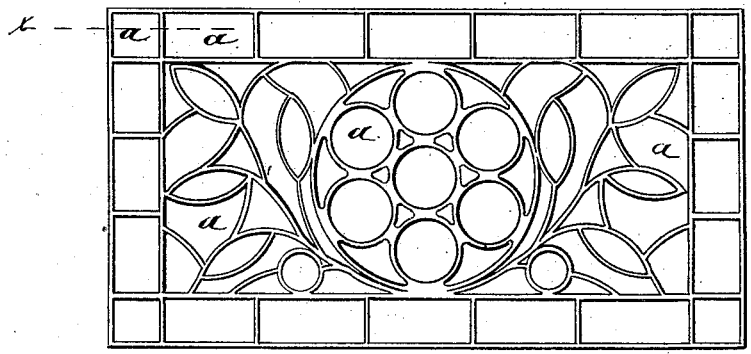
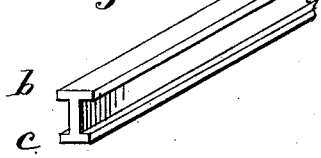
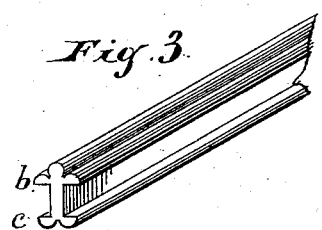
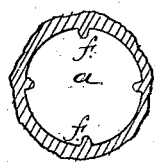
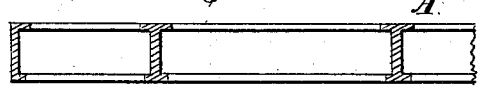
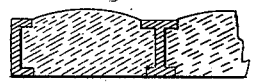
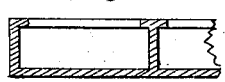
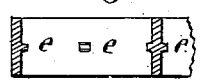
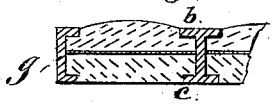
Witnesses:
E. A. West
A. H. Adams
Inventor:
Hollon F. Miles

UNITED STATES PATENT OFFICE.

HOLLON F. MILES, OF CHICAGO, ILLINOIS, ASSIGNOR TO HIMSELF AND JOHN McCULLY, OF SAME PLACE.

MANUFACTURE OF DECORATIVE GLASS PRODUCTS.

SPECIFICATION forming part of Letters Patent No. 287,768, dated October 30, 1883.

Application filed August 20, 1883. (No model.)

*To all whom it may concern:*

Be it known that I, HOLLON F. MILES, residing at Chicago, in the county of Cook and State of Illinois, and a citizen of the United States, have invented new and useful Improvements in the Manufacture of Decorative Glass Products, of which the following is a full description, reference being had to the accompanying drawings, in which—

Figure 1 is a plan representing a frame without glass; Fig. 2, a detail in perspective. Fig. 3 shows a modified form. Fig. 4 is a vertical section at line $x$ of Fig. 1; Fig. 5, a vertical section, showing glass in the frame. Fig. 6 is a vertical section, showing a metal sheet in the glass. Fig. 7 is a vertical section, showing metal behind the glass for ornament. Figs. 8, 9, and 10 are modifications. As compared with Fig. 1 all the other figures are enlarged.

My improvement is designed to be used in making ornamental panels and other decorative glass products designed to be used in ceilings, walls, windows, mantels, and other places.

The object of my invention is to produce improved effects in this class of work; and it consists in providing a strong metal frame made in the form of the design for the panel or other decorative piece, having suitable flanges or being otherwise adapted to receive and hold the glass, and in filling the open spaces by pouring melted glass of the desired colors into the several spaces. My invention further consists in combining thin sheets of metal with the decorative piece, all as hereinafter fully described.

In the drawings, A represents a strong metal frame-work, the form of which corresponds with that of the design or picture which is to be presented by the decorative article, the open spaces $a$ between the several parts of the frame being designed to receive colored glass. Those portions of this frame which surround the openings for glass have flanges $b\ c$ at the top and bottom, as shown in Fig. 2. These portions of the frame may have flat surfaces, as shown in Fig. 2, or they may have any suitable ornamental form, one such form being shown in Fig. 3.

As shown in the drawings, the frame is an open one; but when the decorative piece is to be used where light will not be transmitted through it—as, for exemple a panel in a mantel—the frame may have a solid metal back, $d$, as shown in Fig. 8.

Instead of flanges at the top and bottom of the frame it may be provided with small projections $e$, placed preferably about midway between the top and bottom and extending into each of the spaces to be filled with glass, as shown in Fig. 9; or, instead of continuous flanges, there may be projections $f$, Fig. 10, at suitable intervals, and sufficient in number to hold the glass in place.

The frame having been provided, it is to be placed upon a suitable surface or support, and melted glass of the desired color is to be poured into each one of the openings or spaces $a$ in the frame. The glass will flow in between the flanges when flanges are used, and thus will be held securely in place in the frame.

When projections $e$ are used instead of flanges $b\ c$, the melted glass will flow around such projections, and the glass will be held in place by them. When the projections $f$ are used, the glass will be held in place by them.

The upper surface of the glass in each space $a$ may be convex, as shown in Fig. 5. The surface will be likely to be uneven, or can easily be made more or less so, for the purpose of producing more brilliant effects. Designs of various forms can be stamped on the top of the hot glass if desired. Pieces of pounded glass or of other suitable material may be sprinkled on the surface of the glass before it has cooled too much, to aid in producing desired effects. The frame may be made of any desired thickness, and should be sufficiently strong to support the weight of the glass.

To produce metallic effects, after partly filling a desired space with melted glass, I place a thin sheet of metal on the glass and then pour melted glass upon the top of such sheet of metal until the space is filled. In Fig. 6 this construction is shown, $g$ being the thin sheet of metal. Metallic effects can also be produced by means of a backing of suitable sheet metal, (indicated by $h$ in Fig. 7,) or, when the frame has a back, pieces of suitable sheet metal may be placed in the open spaces, or a portion of them, before pouring in the glass.

Any desired suitable form can be given to the pieces of metal placed in the spaces for the purpose of producing metallic effects, and any desired number of the spaces may be so provided with metal. If desired, bits of suitable metal may be embedded in the molten glass. By "suitable metal" I mean that which will reflect light, and thus aid in producing brilliant effects.

The frame shown in the drawings is flat, but its form may be adapted to the place where it is to be used. When no permanent back is provided for the frame, it is to be placed upon a surface adapted to receive it while the melted glass is poured into the spaces.

What I claim as new, and desire to secure by Letters Patent, is as follows—

1. As a new article of manufacture, a decorative glass structure, consisting of a strong frame-work made in the form of the design which the decorative article is to present, the openings being filled by pouring into them melted glass of the desired colors, substantially as specified.

2. As a new article of manufacture, a colored-glass decorative article, consisting of a metal frame-work having openings filled with melted glass, in combination with suitable pieces of metal embedded in or covered by the melted glass, substantially as and for the purpose specified.

HOLLON F. MILES.

Witnesses:
H. M. MUNDAY,
A. H. ADAMS.